(12) United States Patent
Zheng et al.

(10) Patent No.: US 9,499,693 B2
(45) Date of Patent: Nov. 22, 2016

(54) CLEAN POLYCARBONATE MATERIAL FOR USE IN HARD DISK DRIVE AND SEMICONDUCTOR APPLICATIONS

(71) Applicants: Yun Zheng, Shanghai (CN); Xiangping (David) Zou, Shanghai (CN); Fanshun Meng, Shanghai (CN); Yangang Yan, Shanghai (CN)

(72) Inventors: Yun Zheng, Shanghai (CN); Xiangping (David) Zou, Shanghai (CN); Fanshun Meng, Shanghai (CN); Yangang Yan, Shanghai (CN)

(73) Assignee: SABIC GLOBAL TECHNOLOGIES B.V. (NL)

( * ) Notice: Subject to any disclaimer, the term of this patent is extended or adjusted under 35 U.S.C. 154(b) by 278 days.

(21) Appl. No.: 13/670,635

(22) Filed: Nov. 7, 2012

(65) Prior Publication Data

US 2014/0124709 A1    May 8, 2014

Related U.S. Application Data

(60) Provisional application No. 61/556,564, filed on Nov. 7, 2011.

(30) Foreign Application Priority Data

Nov. 6, 2012 (WO) ................. PCT/IB2012/056201

(51) Int. Cl.
*H01B 1/02*   (2006.01)
*C08L 67/02*  (2006.01)
*C08L 69/00*  (2006.01)

(52) U.S. Cl.
CPC .............. *C08L 67/02* (2013.01); *C08L 69/005* (2013.01); *C08K 2201/001* (2013.01)

(58) Field of Classification Search
CPC ............................. C08L 69/00; C08L 67/02
USPC ........... 252/500, 511; 524/96, 116, 122, 508
See application file for complete search history.

(56) References Cited

U.S. PATENT DOCUMENTS

| | | |
|---|---|---|
| 3,516,968 A | 6/1970 | Moore et al. |
| 5,106,904 A | 4/1992 | Fontana et al. |
| 7,112,644 B2 | 9/2006 | Morishita et al. |
| 7,244,804 B2 | 7/2007 | Ikeda et al. |
| 7,504,452 B2 | 3/2009 | Hayata et al. |
| 2009/0186966 A1* | 7/2009 | Gallucci et al. ............... 524/96 |
| 2010/0041831 A1 | 2/2010 | Chung et al. |
| 2010/0056700 A1 | 3/2010 | Chung et al. |
| 2010/0160559 A1 | 6/2010 | Lee et al. |

FOREIGN PATENT DOCUMENTS

| | | |
|---|---|---|
| JP | 2009172639 A1 | 8/2009 |
| WO | 2013020004 | 2/2013 |
| WO | 2013020004 A1 | 2/2013 |

OTHER PUBLICATIONS

Japanese Patent No. 2009172639 (A); Publication Date: Aug. 6, 2009; Machine Translation; 12 Pages.

* cited by examiner

*Primary Examiner* — Khanh Tuan Nguyen
(74) *Attorney, Agent, or Firm* — Cantor Colburn LLP

(57) ABSTRACT

Compositions based on polycarbonate copolymers to provide ultra-clean materials and articles useful in the hard disk drive and semiconductor industries. In one aspect, the compositions include a polycarbonate copolymer based on a sebacic acid, BPA, PCP polyestercarbonate. The compositions may be used with or without other polymers, fillers or additives. The compositions based on this polycarbonate copolymer exhibit ultra clean performance, low organic contamination, low LPC, and low ionic contaminations. Meanwhile, the compositions also exhibit good flow ability, good ductility and good surface quality.

19 Claims, No Drawings

CLEAN POLYCARBONATE MATERIAL FOR USE IN HARD DISK DRIVE AND SEMICONDUCTOR APPLICATIONS

CROSS REFERENCE TO RELATED APPLICATIONS

This application is 371 of PCT/IB2012/056201 Nov. 6, 2012 which claims benefit of 61/556,564 Nov. 7, 2011.

FIELD OF THE INVENTION

The present invention relates to thermoplastic compositions and, in particular, to polycarbonate-based compositions capable of being used as a clean material useful in hard disk drive and semiconductor applications. The present invention also relates to methods of manufacturing these compositions and articles that include these compositions.

BACKGROUND OF THE INVENTION

Organic contaminants, ionic contaminants, and particulate contaminants are key factors that could cause hard disk drive (HDD) failure. Accordingly, it is beneficial to control these types of contaminants to maintain high cleanliness in HDD applications.

The performance of HDDs has consistently progressed resulting in HDDs that have higher storage densities and faster data transfer rates. This has also resulted in HDDs that are more robust and compact in their design. These changes result in more severe requirements on the cleanliness and mechanical properties of the materials used to make these HDDs.

The materials used in making HDDs can generally be divided into metal and plastics. Compared to metal solutions, advanced engineering plastics offer advantages like weight reduction, lower cost, non-corrosive and the ability to form HDDs parts using injection molding, which is suitable for high volume productivity. However, engineering plastics can experience shortcomings such as being less conductive and/or not providing sufficient strength without reinforcement.

As a result, functional fillers such as conductive carbon powder, carbon fiber or sometimes glass fiber will be incorporated with polymers to improve stiffness, dimensional stability and/or electrostatic discharge (ESD) performance. However incorporation of these types of inorganic fillers can adversely affect the flow ability and/or surface quality of the material. Additionally, these fillers can also cause more organic or particulate contaminations in the HDD.

Accordingly, it would be beneficial to provide a material having improved flow that is capable of being used in semiconductor applications, such as HDDs. It would also be beneficial to provide a material having improved mechanical properties but that limits contaminants.

BRIEF SUMMARY OF THE INVENTION

The present invention provides a composition including a polycarbonate copolymer. In one embodiment, the polycarbonate copolymer is a sebacic acid, BPA, PCP polyester-carbonate. The composition having the polycarbonate copolymer is capable of being used as an ultra clean material suitable for HDD-semiconductor applications. The compositions may be used with or without other polymers, fillers or additives. The compositions based on this polycarbonate copolymer exhibit ultra clean performance, low organic contamination, low LPC (liquid particle counts), and low ionic contaminations. Meanwhile, the compositions also exhibit good flow ability, good ductility and good surface quality.

Accordingly, in one aspect, the present invention provides a thermoplastic composition including 50 to 95% by weight of one or more polycarbonates wherein at least one of the polycarbonates is a polyester-polycarbonate having at least one unit derived from sebacic acid and has a biocontent of at least 5% according ASTM-D6866; and 5 to 50% by weight of at least one filler selected from glass, ceramic filler, carbon fiber, a conductive filler, polytetrafluoroethylene (PTFE), or a combination including at least one of the foregoing fillers; wherein the composition has a melt volume rate of greater than 6 cm$^3$/10 minutes at 300° C./2.16 kg according to ASTM-D1238-10, a total outgassing of less than 1.0 ppm as measured using a dynamic head space Gas Chromatograph/Mass Spectrometer at 85° C. for 3 hours, and a total organic contents of less than 120 ppb in pellets.

In another aspect, the present invention provides a method of forming a thermoplastic composition including the steps of weighing, pre-blending, extrusion, cooling, pelletizing, and packaging following a clean compound system standard operating procedure.

In yet another aspect, the present invention provides an article of manufacture that includes a composition including 50 to 95% by weight of one or more polycarbonates wherein at least one of the polycarbonates is a polyester-polycarbonate having at least one unit derived from sebacic acid and has a biocontent of at least 5% according ASTM-D6866; and 5 to 50% by weight of at least one filler selected from glass, carbon fiber, a conductive filler, polytetrafluoroethylene, or a combination including at least one of the foregoing fillers; wherein the composition, as compared to a composition comprising a bisphenol A-based polycarbonate having the same at least one filler and filler loading, has a melt volume rate as measured according to ASTM-D1238-10 that is at least 20% higher, an impact strength that is at least 20% higher, and a liquid particle count that is at least 20% lower In still another aspect, the present invention provides a thermoplastic composition including 65 to 90% by weight of one or more polycarbonates wherein at least one of the polycarbonates is a polyester-polycarbonate having at least one unit derived from sebacic acid and has a biocontent of at least 5% according ASTM-D6866; and 10 to 35% by weight of at least one filler selected from glass, carbon fiber, a conductive filler, polytetrafluoroethylene, or a combination including at least one of the foregoing fillers; wherein the composition, as compared to a composition comprising a bisphenol A-based polycarbonate having the same at least one filler and filler loading, has a melt volume rate as measured according to ASTM-D1238-10 that is at least 20% higher, an impact strength that is at least 20% higher, and a liquid particle count that is at least 20% lower.

In yet another aspect, the present invention provides an article of manufacture that includes a composition including 65 to 90% by weight of one or more polycarbonates wherein at least one of the polycarbonates is a polyester-polycarbonate having at least one unit derived from sebacic acid and has a biocontent of at least 5% according ASTM-D6866; and 10 to 35% by weight of at least one filler selected from glass, carbon fiber, a conductive filler, polytetrafluoroethylene, or a combination including at least one of the foregoing fillers; wherein the composition, as compared to a composition comprising a bisphenol A-based polycarbonate having the same at least one filler and filler loading, has a melt volume rate as measured according to ASTM-D1238-10 that is at least 20% higher, an impact strength that is at least 20% higher, and a liquid particle count that is at least 20% lower.

DETAILED DESCRIPTION OF THE INVENTION

The present invention is more particularly described in the following description and examples that are intended to be illustrative only since numerous modifications and variations therein will be apparent to those skilled in the art. As used in the specification and in the claims, the term "comprising" may include the embodiments "consisting of" and "consisting essentially of." All ranges disclosed herein are inclusive of the endpoints and are independently combinable. The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value.

The terminology used herein is for the purpose of describing particular embodiments only and is not intended to be limiting. As used in the specification and the appended claims, the singular forms "a," "and" and "the" include plural references unless the context clearly dictates otherwise.

"Alkyl" as used herein may mean a linear, branched, or cyclic group, such as a methyl group, ethyl group, n-propyl group, isopropyl group, n-butyl group, isobutyl group, tert-butyl group, n-pentyl group, isopentyl group, n-hexyl group, isohexyl group, cyclopentyl group, cyclohexyl group, and the like.

"Alkenyl" as used herein may be a straight or branched hydrocarbyl chain containing one or more double bonds. Each carbon-carbon double bond may have either cis or trans geometry within the alkenyl moiety, relative to groups substituted on the double bond carbons. Non-limiting examples of alkenyl groups include ethenyl (vinyl), 2-propenyl, 3-propenyl, 1,4-pentadienyl, 1,4-butadienyl, 1-butenyl, 2-butenyl, and 3-butenyl.

"Alkenylene" as used herein may be a divalent unsaturated hydrocarbyl chain which may be linear or branched and which has at least one carbon-carbon double bond. Non-limiting examples of alkenylene groups include —C(H)=C(H)—, —C(H)=C(H)—CH$_2$—, —C(H)=C(H)—CH$_2$—CH$_2$—, —CH$_2$—C(H)=C(H)—CH$_2$—, —C(H)=C(H)—CH(CH$_3$)—, and —CH$_2$—C(H)=C(H)—CH(CH$_2$CH$_3$)—.

"Biocontent" as used herein may mean a polymer or composition containing a polymer derived, at least in part, from biologically-based molecular units. The biologically-based unit may be a biologically-derived monomer. The biologically based monomer may be derived from a plant, for example. The plant may be any plant, such as a starch-based plant, castor bean, palm oil, vegetable oil, sugar cane, corn, rice, switch-grass, etc. The biologically-based unit may be isosorbide, sebacic acid, azelaic acid etc.

"Copolymer" as used herein may mean a polymer derived from two or more structural unit or monomeric species, as opposed to a homopolymer, which is derived from only one structural unit or monomer.

"C3-C6 cycloalkyl" as used herein may mean cyclopropyl, cyclobutyl, cyclopentyl and cyclohexyl.

"Glass Transition Temperature" or "Tg" as used herein may mean the maximum temperature that a polycarbonate will have one or more useful properties. These properties include impact resistance, stiffness, strength, and shape retention. The Tg of a polycarbonate therefore may be an indicator of its useful upper temperature limit, particularly in plastics applications. The Tg may be measured using a differential scanning calorimetry method and expressed in degrees Celsius.

The glass transition temperature of a polycarbonate may depend primarily on the composition of the polycarbonate. Polycarbonates that are formed from monomers having more rigid and less flexible chemical structures than Bisphenol-A generally have higher glass transition temperatures than Bisphenol-A, while polycarbonate that are formed from monomers having less rigid and more flexible chemical structures than Bisphenol-A, for example, generally have lower glass transition temperatures than Bisphenol-A. For example, a polycarbonate described herein formed from 33 mole % of a rigid monomer, 3,3-bis(4-hydroxyphenyl)-2-phenylisoindolin-1-one ("PPPBP"), and 67 mole % Bisphenol-A has a glass transition temperature of 198° C., while a polycarbonate described herein formed from Bisphenol-A, but also having 6 wt % of siloxane units, a flexible monomer, has a glass transition temperature of 145° C.

Mixing of two or more polycarbonates having different glass transition temperatures may result in a glass transition temperature value for the mixture that is intermediate between the glass transition temperatures of the polycarbonates that are mixed.

The glass transition temperature of a polycarbonate may also be an indicator of the molding or extrusion temperatures required to form polycarbonate parts. The higher the glass transition temperature of the polycarbonate the higher the molding or extrusion temperatures that are needed to form polycarbonate parts.

The glass transition temperatures (Tg) described herein are measures of heat resistance of the corresponding polycarbonate and polycarbonate blends. The Tg can be determined by differential scanning calorimetry. The calorimetry method may use a TA Instruments Q1000 instrument, for example, with setting of 20° C./min ramp rate and 40° C. start temperature and 200° C. end temperature.

"Halo" as used herein may be a substituent to which the prefix is attached is substituted with one or more independently selected halogen radicals. For example, "C1-C6 haloalkyl" means a C1-C6 alkyl substituent wherein one or more hydrogen atoms are replaced with independently selected halogen radicals. Non-limiting examples of C1-C6 haloalkyl include chloromethyl, 1-bromoethyl, fluoromethyl, difluoromethyl, trifluoromethyl, and 1,1,1-trifluoroethyl. It should be recognized that if a substituent is substituted by more than one halogen radical, those halogen radicals may be identical or different (unless otherwise stated).

"Halogen" or "halogen atom" as used herein may mean a fluorine, chlorine, bromine or iodine atom.

"Heteroaryl" as used herein may mean any aromatic heterocyclic ring which may comprise an optionally benzo-condensed 5 or 6 membered heterocycle with from 1 to 3 heteroatoms selected among N, O or S. Non limiting examples of heteroaryl groups may include pyridyl, pyrazinyl, pyrimidinyl, pyridazinyl, indolyl, imidazolyl, thiazolyl, isothiazolyl, pyrrolyl, phenyl-pyrrolyl, furyl, phenyl-furyl, oxazolyl, isoxazotyl, pyrazolyl, thienyl, benzothienyl, isoindolinyl, benzoimidazolyl, quinolinyl, isoquinolinyl, 1,2,3-triazolyl, 1-phenyl-1,2,3-triazolyl, and the like.

"Hindered phenol stabilizer" as used herein may mean 3,5-di-tert-butyl-4-hydroxyhydrocinnamic acid, octadecyl ester.

"(Meth)acrylic acid" includes both acrylic and methacrylic acid monomers.

"(Meth)acrylate" includes both acrylate and methacrylate monomers.

"Melt Volume Rate" (MVR) as used herein may measure the rate of extrusion of a thermoplastic through an orifice at a prescribed temperature and load. The MVR measurement is flow rate of a polymer in a melt phase as determined using the method of ASTM-D1238-10. The MVR of a molten polymer is measured by determining the amount of polymer that flows through a capillary of a specific temperature over a specified time using standard weights at a fixed temperature. MVR is expressed in cubic centimeters per 10 minutes at a particular temperature per weight value. MVR may be measured according to the method of ASTM-D1238-10 at 2.16 kilogram at 300° C. The higher the MVR value of a polymer at a specific temperature, the greater the flow of that polymer at that specific temperature.

"PETS release agent" as used herein may mean pentaerythritol tetrastearate, mold release.

"Phosphite stabilizer" as used herein may mean tris-(2,4-di-tert-butylphenyl) phosphite.

"Polycarbonate" as used herein may mean an oligomer or polymer comprising residues of one or more polymer structural units, or monomers, joined by carbonate linkages.

"Straight or branched $C_1$-$C_3$ alkyl" or "straight or branched $C_1$-$C_3$ alkoxy" as used herein may mean methyl, ethyl, n-propyl, isopropyl, methoxy, ethoxy, n-propoxy and isopropoxy.

"Substituted" as used herein may mean that any at least one hydrogen on the designated atom or group is replaced with another group provided that the designated atom's normal valence is not exceeded. For example, when the substituent is oxo (i.e., =O), then two hydrogens on the atom are replaced. Combinations of substituents and/or variables are permissible provided that the substitutions do not significantly adversely affect synthesis or use of the compound.

Unless otherwise indicated, each of the foregoing groups may be unsubstituted or substituted, provided that the substitution does not significantly adversely affect synthesis, stability, or use of the compound.

The terms "structural unit" and "monomer" are interchangeable as used herein.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The present invention is directed to a composition including a polycarbonate copolymer. In one embodiment, the composition includes a sebacic acid polycarbonate, BPA polycarbonate, and a PCP polyestercarbonate. The composition having the polycarbonate copolymer is capable of being used as an ultra clean material suitable for HDD-semiconductor applications. The compositions may be used with or without other polymers, fillers or additives. The compositions based on this polycarbonate copolymer exhibit ultra clean performance, low organic contamination, low LPC, and low ionic contaminations. Meanwhile, the compositions also exhibit good flow ability, good ductility and good surface quality. Articles made of these clean materials by injection molding are capable of satisfying the specifications from the hard disk drives (HDD) and semiconductor industries.

As discussed, the advantages of the compositions of the present invention are lower organic contamination, lower LPC, and lower ionic contaminations as compared to standard polycarbonate-based compositions. The compositions achieve this using a blend polymer that includes at least one polycarbonate and at least one polyestercarbonate. In addition, other fillers capable of being used in hard disk drive and/or semiconductor applications to provide selected characteristics to a molded article may be includes. Using the blend polymer as the base resin results in lower contaminants from the resin and fillers thereby increasing the usefulness of these polymer blends in these types of applications.

Accordingly, in one aspect, the blend polymer composition includes a combination or one or more polycarbonates. "Polycarbonates" and "polycarbonate resins" may include homopolycarbonates, copolymers comprising different moieties in the carbonate (referred as "copolycarbonates"), copolymers comprising carbonate units and other types of polymer units such as polyester units, polysiloxane units, and combinations comprising at least one homopolycarbonates and copolycarbonates.

The polycarbonate may be a homopolycarbonate or a copolycarbonate. The term "polycarbonate" and "polycarbonate resin" mean compositions having repeating structural carbonate units of the formula (1):

(1)

wherein at least about 60 percent of the total number of $R^1$ groups may contain aromatic organic groups and the balance thereof are aliphatic or alicyclic, or aromatic groups. $R^1$ in the carbonate units of formula (1) may be a $C_6$-$C_{36}$ aromatic group wherein at least one moiety is aromatic. Each $R^1$ may be an aromatic organic group, for example, a group of the formula (2):

-$A^1$-$Y^1$-$A^2$-     (2)

wherein each of the $A^1$ and $A^2$ is a monocyclic divalent aryl group and $Y^1$ is a bridging group having one or two atoms that separate $A^1$ and $A^2$. For example, one atom may separate $A^1$ from $A^2$, with illustrative examples of these groups including —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecyclidene, cyclododecylidene, and adamantylidene. The bridging group of $Y^1$ may be a hydrocarbon group or a saturated hydrocarbon group such as methylene, cyclohexlylidene, or isopropylidene.

The polycarbonates may be produced from dihydroxy compounds having the formula HO—$R^1$—OH, wherein $R^1$ is defined as above for formula (1). The formula HO—$R^1$—OH includes bisphenol compounds of the formula (3):

HO-$A^1$-$Y^1$-$A^2$-OH     (3)

wherein $Y^1$, $A^1$, and $A^2$ are as described above. For example, one atom may separate $A^1$ and $A^2$. Each $R^1$ may include bisphenol compounds of the general formula (4):

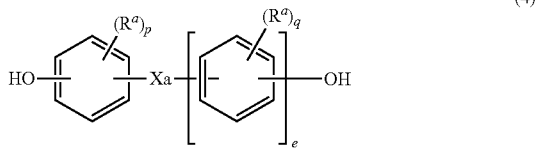

(4)

$X_a$ may be a bridging group connecting the two hydroxy-substituted aromatic groups, where the bridging group and the hydroxy substituent of each $C_6$ arylene group are disposed ortho, meta, or para (specifically para) to each other on the $C_6$ arylene group. For example, the bridging group $X_a$ may be single bond, —O—, —S—, —C(O)—, or a $C_{1-18}$ organic group. The $C_{1-18}$ organic bridging group may be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. $R^a$ and $R^b$ may each represent a halogen, $C_{1-12}$ alkyl group or combination thereof. For example, $R^a$ and $R^b$ may each be a $C_{1-3}$ alkyl group, specifically methyl, disposed meta to the hydroxy group on each arylene group. The designation (e) is 0 or 1. The numbers p and q are each independently integers of 0 to 4. It will be understood that $R^a$ is hydrogen when p is 0, and likewise $R^b$ is hydrogen when q is 0.

$X_a$ may be substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. This may include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene. A specific example wherein $X_a$ is a substituted cycloalkylidene is the cyclohexylidene-bridged, alkyl-substituted bisphenol of formula (5):

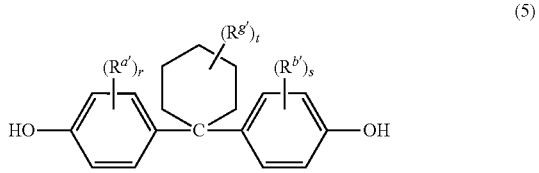

(5)

wherein $R^{a'}$ and $R^{b'}$ are each independently $C_{1-12}$ alkyl, $R^g$ is $C_{1-12}$ alkyl or halogen, r and s are each independently 1 to 4, and t is 0 to 10. $R^{a'}$ and $R^{b'}$ may be disposed meta to the cyclohexylidene bridging group. The substituents $R^{a'}$, $R^{b'}$ and $R^g$ may, when comprising an appropriate number of carbon atoms, be straight chain, cyclic, bicyclic, branched, saturated, or unsaturated. For example, $R^g$ may be each independently $C_{1-4}$ alkyl, $R^g$ is $C_{1-4}$ alkyl, r and s are each 1, and t is 0 to 5. In another example, $R^{a'}$, $R^{b'}$ and $R^g$ may each be methyl, r and s are each 1, and t is 0 or 3. The cyclohexylidene-bridged bisphenol can be the reaction product of two moles of o-cresol with one mole of cyclohexanone. In another example, the cyclohexylidene-bridged bisphenol may be the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol-containing polycarbonates, or a combination comprising at least one of the foregoing with other bisphenol polycarbonates, are supplied by Bayer Co. under the APEC® trade name.

$X_a$ is a $C_{1-18}$ alkylene group, a $C_{3-18}$ cycloalkylene group, a fused $C_{6-18}$ cycloalkylene group, or a group of the formula —$B_1$—W—$B_2$— wherein $B_1$ and $B_2$ are the same or different $C_{1-6}$ alkylene group and W is a $C_{3-12}$ cycloalkylidene group or a $C_{6-16}$ arylene group.

In another example, $X_a$ may be a substituted $C_{3-18}$ cycloalkylidene of the formula (6):

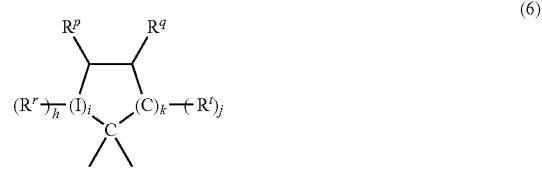

(6)

wherein $R^r$, $R^p$ $R^q$ and $R^t$ are independently hydrogen, halogen, oxygen, or $C_{1-12}$ organic groups; I is a direct bond, a carbon, or a divalent oxygen, sulfur, or —N(Z)— where Z is hydrogen, halogen, hydroxy, $C_{1-12}$ alkyl, $C_{1-12}$ alkoxy, $C_{6-12}$ aryl, or $C_{1-12}$ acyl; h is 0 to 2, j is 1 or 2, i is an integer of 0 or 1, and k is an integer of 0 to 3, with the proviso that at least two of $R^r$, $R^p$ $R^q$ and $R^t$ taken together are a fused cycloaliphatic, aromatic, or heteroaromatic ring. It will be understood that where the fused ring is aromatic, the ring as shown in formula (5) will have an unsaturated carbon-carbon linkage where the ring is fused. When i is 0, h is 0, and k is 1, the ring as shown in formula (5) contains 4 carbon atoms; when i is 0, h is 0, and k is 2, the ring as shown contains 5 carbon atoms, and when i is 0, h is 0, and k is 3, the ring contains 6 carbon atoms. In one example, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Other useful dihydroxy compounds having the formula HO—$R^1$—OH include aromatic dihydroxy compounds of formula (7):

(7)

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

Bisphenol-type dihydroxy aromatic compounds may include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxy-3 methyl phenyl)cyclohexane 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

Examples of the types of bisphenol compounds represented by formula (3) may include 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine ("PBPP"), 9,9-bis(4-hydroxyphenyl)fluorene, and 1,1-bis(4-hydroxy-3-methylphenyl)cyclohexane ("DMBPC"). Combinations comprising at least one of the foregoing dihydroxy aromatic compounds can also be used.

The dihydroxy compounds of formula (3) may be the following formula (8):

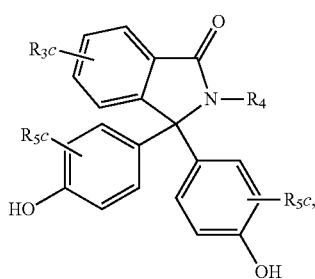

(8)

wherein $R_3$ and $R_5$ are each independently a halogen or a $C_{1-6}$ alkyl group, $R_4$ is a $C_{1-6}$ alkyl, phenyl, or phenyl substituted with up to five halogens or $C_{1-6}$ alkyl groups, and c is 0 to 4. In a specific embodiment, $R_4$ is a $C_{1-6}$ alkyl or phenyl group. In still another embodiment, $R_4$ is a methyl or phenyl group. In another specific embodiment, each c is 0.

The dihydroxy compounds of formula (3) may be the following formula (9):

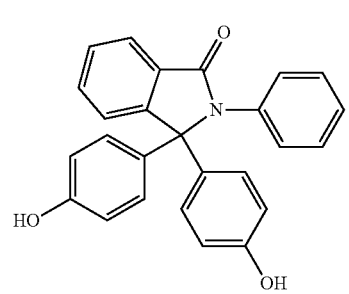

(9)

(also known as 3,3-bis(4-hydroxyphenyl)-2-phenylisoindolin-1-one (PPPBP)).

Alternatively, the dihydroxy compounds of formula (3) may be the following formula (10):

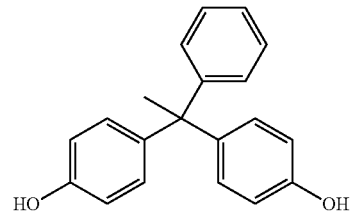

(10)

(also known as 4,4'-(1-phenylethane-1,1-diyl)diphenol (bisphenol AP) or 1,1-bis(4-hydroxyphenyl)-1-phenyl-ethane).

Alternatively, the dihydroxy compounds of formula (3) may be the following formula (11):

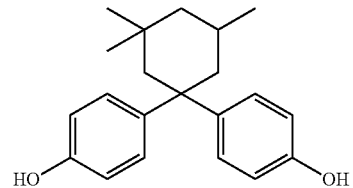

(11)

4,4'-(3,3,5-trimethylcyclohexane-
1,1-diyl)diphenol (bisphenol TMC) or 1,1-bis(4-hydroxyphenyl)-3,3,5-trimethylcyclohexane).

Exemplary copolymers containing carbonate units may be derived from bisphenol A. A polyester-polycarbonate as described below way can also be used that contains units derived from a mixture of bisphenol A and PBPP, in a molar ratio of BPA:PBPP of 10:90 to 90:10, specifically 15:85 to 85:15.

The polycarbonate may be a copolymer comprising homopolycarbonate units as described above in (1) and other types of polymer units such as polyester units. A specific type of copolymer may be a polyestercarbonate, also known as a polyester-polycarbonate. As used herein, these terms are synonymous. The composition may comprise at least one or least two polyester-polycarbonates. Such copolymers further contain, in addition to recurring carbonate chain units of the formula (1) as described above, repeating ester units of formula (12):

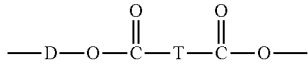

(12)

wherein O-D-O is a divalent group derived from a dihydroxy compound, and D may be, for example, one or more alkyl containing $C_6$-$C_{20}$ aromatic group(s), or one or more $C_6$-$C_{20}$ aromatic group(s), a $C_{2-10}$ alkylene group, a $C_{6-20}$ alicyclic group, a $C_{6-20}$ aromatic group or a polyoxyalkylene group in which the alkylene groups contain 2 to about 6 carbon atoms, specifically 2, 3, or 4 carbon atoms. D may be a $C_{2-30}$ alkylene group having a straight chain, branched chain, or cyclic (including polycyclic) structure. O-D-O may be derived from an aromatic dihydroxy compound of formula (3) above. O-D-O may be derived from an aromatic dihydroxy compound of formula (4) above. O-D-O may be derived from an aromatic dihydroxy compound of formula (7) above.

The molar ratio of ester units to carbonate units in the copolymers may vary broadly, for example 1:99 to 99:1, specifically 10:90 to 90:10, more specifically 25:75 to 75:25, expand depending on the desired properties of the final composition.

T of formula (12) may be a divalent group derived from a dicarboxylic acid, and may be, for example, a $C_{2-10}$ alkylene group, a $C_{6-20}$ alicyclic group, a $C_{6-20}$alkyl aromatic group, a $C_{6-20}$ aromatic group, or a $C_6$ to $C_{36}$ divalent organic group derived from a dihydroxy compound or chemical equivalent thereof. T may be an aliphatic group, wherein the molar ratio of carbonate units of formula (1) to ester units of formula (12) in the polyester-polycarbonate copolymer is from 99:1 to 60:40; and 0.01 to 10 weight percent, based on the total weight of the polymer component, of a polymeric containing compound. T may be derived from a $C_6$-$C_{20}$ linear aliphatic alpha-omega (αΩ) dicarboxylic ester.

Diacids from which the T group in the ester unit of formula (12) is derived include aliphatic dicarboxylic acid from 6 to about 36 carbon atoms, optionally from 6 to 20 carbon atoms. The $C_6$-$C_{20}$ linear aliphatic alpha-omega (αΩ) dicarboxylic esters may be adipic acid, sebacic acid, 3,3-dimethyl adipic acid, 3,3,6-trimethyl sebacic acid, 3,3,5,5-tetramethyl sebacic acid, azelaic acid, dodecanedioic acid, dimer acids, cyclohexane dicarboxylic acids, dimethyl cyclohexane dicarboxylic acid, norbornane dicarboxylic acids, adamantane dicarboxylic acids, cyclohexene dicarboxylic acids, $C_{14}$, $C_{18}$ and $C_{20}$ diacids.

Saturated aliphatic alpha-omega dicarboxylic acids may be adipic acid, sebacic or dodecanedioic acid. Sebacic acid is a dicarboxylic acid having the following formula (13):

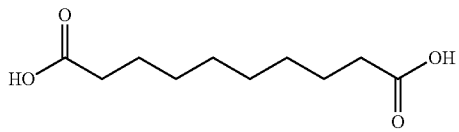

(13)

Sebacic acid has a molecular mass of 202.25 g/mol, a density of 1.209 g/cm³ (25° C.) and a melting point of 294.4° C. at 100 mmHg. Sebacic acid is derived from castor oil and is naturally occurring.

Other examples of aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids may be terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is about 91:9 to about 2:98.

Overall, D of the polyester-polycarbonate may be a $C_{2-6}$ alkylene group and T is p-phenylene, m-phenylene, naphthalene, a divalent cycloaliphatic group, or a combination thereof. This class of polyester includes the poly(alkylene terephthalates).

Mixtures of the diacids can also be employed. It should be noted that although referred to as diacids, any ester precursor could be employed such as acid halides, specifically acid chlorides, and diaromatic esters of the diacid such as diphenyl, for example the diphenylester of sebacic acid. With reference to the diacid carbon atom number earlier mentioned, this does not include any carbon atoms which may be included in the ester precursor portion, for example diphenyl. It may be desirable that at least four, five or six carbon bonds separate the acid groups. This may reduce the formation of undesirable and unwanted cyclic species.

The polyester unit of a polyester-polycarbonate may be derived from the reaction of a combination of isophthalic and terephthalic diacids (or derivatives thereof) with resorcinol. In another embodiment, the polyester unit of a polyester-polycarbonate may be derived from the reaction of a combination of isophthalic acid and terephthalic acid with bisphenol-A. In an embodiment, the polycarbonate units may be derived from bisphenol A. In another specific embodiment, the polycarbonate units may be derived from resorcinol and bisphenol A in a molar ratio of resorcinol carbonate units to bisphenol A carbonate units of 1:99 to 99:1.

Useful polyesters may include aromatic polyesters, poly(alkylene esters) including poly(alkylene arylates), and poly(cycloalkylene diesters). Aromatic polyesters may have a polyester structure according to formula (12), wherein D and T are each aromatic groups as described hereinabove. Useful aromatic polyesters may include, for example, poly(isophthalate-terephthalate-resorcinol) esters, poly(isophthalate-terephthalate-bisphenol-A) esters, poly[(isophthalate-terephthalate-resorcinol) ester-co-(isophthalate-terephthalate-bisphenol-A)]ester, or a combination comprising at least one of these.

The polyester-polycarbonate may have a biocontent according to ASTM-D-6866 of at least 2 weight %, 3 weight %, 4 weight %, 5 weight %, 6 weight %, 7 weight %, 8 weight %, 9 weight %, 10 weight %, 11 weight %, 12 weight %, 13 weight %, 14 weight %, 15 weight %, 16 weight %, 17 weight %, 18 weight %, 19 weight %, 20 weight %, 25 weight %, 30 weight %, 35 weight %, 40 weight %, 45 weight %, 50 weight %, 55 weight %, 60 weight % or 65 weight % of the composition derived therefrom. The polyester-polycarbonate may have a biocontent according to ASTM-D-6866 of at least 5 weight % of the blend polymer composition. The polymer, or any composition derived therefrom, may have at least 5.0% weight percent of sebacic acid content.

The polyester-polycarbonate copolymer may be derived from sebacic acid. At least one or two polyester-polycarbonates derived from sebacic acid may be present in the composition. Overall at least one polyester-polycarbonate copolymer may have a molecular weight average between 15,000 to 40,000 Daltons as measured by gel permeation chromatography polycarbonate standards and a 5.0 mole % to 15.0 mole % sebacic acid (of the total composition). The polyester-polycarbonate copolymer may include a singular polyester-polycarbonate copolymer or may be a combination of two or more polyester-polycarbonate copolymers such that the resulting combination has a molecular weight average between 15,000 to 40,000 Daltons as measured by gel permeation chromatography polycarbonate standards and a 5.0 mole % to 15.0 mole % sebacic acid (of the total composition).

Accordingly, in one embodiment, the polyester-polycarbonate includes at least one, polyester-polycarbonate copolymer having a molecular weight average between 30,000 to 40,000 Daltons as measured by gel permeation chromatography polycarbonate standards, and a 5.0 mole % to 15.0 mole % sebacic acid (of the total composition).

In another embodiment, the polyester-polycarbonate includes at least one, polyester-polycarbonate copolymer having a molecular weight average between 15,000 to 25,000 Daltons as measured by gel permeation chromatography polycarbonate standards and a 5.0 mole % to 12.0 mole % sebacic acid (of the total composition).

The polyester-polycarbonate copolymer may contain 5.0%, 6.0%, 7.0%, 8.0%, 9.0%, 10.0%, 11.0%, 12.0%, 13.0%, 14.0%, and 15.0% sebacic acid.

In one form, the polyester-polycarbonate copolymer may be derived from the reaction of sebacic acid with bisphenol A. Sebacic acid/BPA containing polyester-polycarbonate copolymer has the following formula (14):

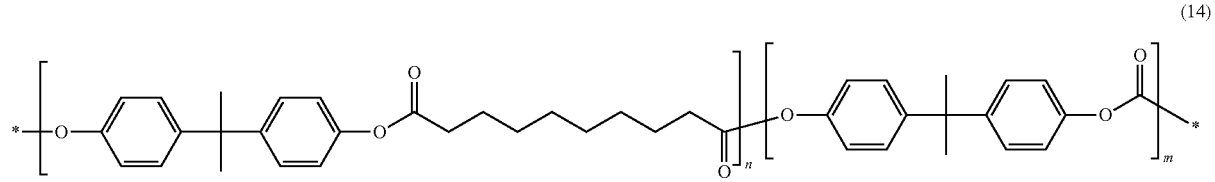

(14)

Formula (14) may be designed to be high flow ductile (HFD) polyester-polycarbonate copolymer (HFD). The high flow ductile (HFD) copolymer may have a low molecular weight sebacic acid at 6.0 mol % sebacic acid and at 21 kMw. HFD may have a high molecular weight sebacic acid at 8.5 mol % at 36.5 kMw.

Overall at least one polyester HFD-HM copolymer may have a molecular weight average between 30,000 to 40,000 Daltons as measured by gel permeation chromatography polycarbonate standards and a 7.0 mole % to 12.0 mole % sebacic acid (of the total composition). At least one polyester HFD-HM copolymer may have a molecular weight average between 32,000 to 40,000 Daltons as measured by gel permeation chromatography polycarbonate standards and a 7.0 mole % to 10.0 mole % sebacic acid (of the total composition). At least one polyester HFD-HM copolymer may have a molecular weight average between 34,000 to 39,000 Daltons as measured by gel permeation chromatography polycarbonate standards and a 7.0 mole % to 9.0 mole % sebacic acid (of the total composition). At least one polyester-HFD-HM copolymer may have a molecular weight average between 35,000 to 38,000 Daltons as measured by gel permeation chromatography polycarbonate standards and a 7.75 mole % to 8.75 mole % sebacic acid (of the total composition). At least one polyester HFD-HM copolymer may have a molecular weight average of 36,500 Daltons as measured by gel permeation chromatography polycarbonate standards and a 8.25 mole % sebacic acid (of the total composition).

At least one polyester HFD-LM copolymer may have a molecular weight average between 15,000 to 25,000 Daltons as measured by gel permeation chromatography polycarbonate standards and a 3.0 mole % to 7.0 mole % sebacic acid (of the total composition). At least one polyester HFD-LM copolymer may have a molecular weight average between 17,000 to 25,500 Daltons as measured by gel permeation chromatography polycarbonate standards and a 4.0 mole % to 7.0 mole % sebacic acid (of the total composition). At least one polyester HFD-LM copolymer may have a molecular weight average between 19,000 to 23,000 Daltons as measured by gel permeation chromatography polycarbonate standards and a 5.0 mole % to 7.0 mole % sebacic acid (of the total composition). At least one polyester HFD-LM copolymer may have a molecular weight average between 20,000 to 22,000 Daltons as measured by gel permeation chromatography polycarbonate standards and a 5.5 mole % to 6.5 mole % sebacic acid (of the total composition). At least one polyester HFD-LM copolymer may have a molecular weight average of 21,500 Daltons as measured by gel permeation chromatography polycarbonate standards and a 6.0 mole % sebacic acid (of the total composition).

The sebacic acid derived polyester-polycarbonate may have a biocontent according to ASTM-D-6866 of at least 2 weight %, 3 weight %, 4 weight %, 5 weight %, 6 weight %, 7 weight %, 8 weight %, 9 weight %, 10 weight %, 11 weight %, 12 weight %, 13 weight %, 14 weight %, 15 weight %, 16 weight %, 17 weight %, 18 weight %, 19 weight %, 20 weight %, 25 weight %, 30 weight %, 35 weight %, 40 weight %, 45 weight %, 50 weight %, 55 weight %, 60 weight % or 65 weight % of the composition derived therefrom. The polyester-polycarbonate may have a biocontent according to ASTM-D-6866 of at least 5 weight %. The polymer, or any composition derived therefrom, may have at least 5.0% weight percent of sebacic acid content.

The polyester-polycarbonate copolymers beneficially have a low level of carboxylic anhydride groups. Anhydride groups are where two aliphatic diacids, or chemical equivalents, react to form an anhydride linkage. The amount of carboxylic acid groups bound in such anhydride linkages should be less than 10 mole % of the total amount of carboxylic acid content in the copolymer. In other embodiments, the anhydride content should be less than 5 mole % of carboxylic acid content in the copolymer, and in yet other embodiments, the carboxylic acid content in the copolymer should be less than 2 mole %. Low levels of anhydride groups can be achieved by known methods, for example conducting an interfacial polymerization reaction of dicarboxylic acid, bisphenol and phosgene initially at a low pH (from about 4 to 6) to get high incorporation of the diacid in the polymer, and then after a proportion of the monomer has been incorporated into the growing polymer chain, switching to a high pH (from about 10 to 11) to convert any anhydride groups into ester linkages. Anhydride linkages can be determined by numerous methods known in the art, for instance proton NMR analyses showing signal for the hydrogens adjacent to the carbonyl group. In an embodiment, the polyester-polycarbonate copolymer has a low amount of anhydride linkages, such as less than 5 mole %, specifically less than 3 mole %, and more specifically less than 2 mole %, as determined by proton NMR analysis. Low amounts of anhydride linkages in the polyester-polycarbonate copolymer contributes to superior melt stability in the copolymer, as well as other desirable properties.

Polycarbonates may be manufactured by processes such as interfacial polymerization and melt polymerization. High Tg copolycarbonates are generally manufactured using interfacial polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as, for example, a tertiary amine or a phase transfer catalyst, under controlled pH conditions, e.g., 8 to 10. The most commonly used water immiscible solvents include methylene chloride, 1,2-dichloroethane, chlorobenzene, toluene, and the like.

Exemplary carbonate precursors may include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. For example, an interfacial polymerization reaction to form carbonate linkages uses phosgene as a carbonate precursor, and is referred to as a phosgenation reaction.

Among tertiary amines that can be used are aliphatic tertiary amines such as triethylamine, tributylamine, cycloaliphatic amines such as N,N-diethyl-cyclohexylamine and aromatic tertiary amines such as N,N-dimethylaniline.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl⁻, Br⁻, a $C_{1-8}$ alkoxy group or a $C_{6-18}$ aryloxy group. An effective amount of a phase transfer catalyst can be 0.1 to 10 wt % based on the weight of bisphenol in the phosgenation mixture. For example, an effective amount of phase transfer catalyst can be 0.5 to 2 wt % based on the weight of bisphenol in the phosgenation mixture.

The polycarbonate may be prepared by a melt polymerization process. Generally, in the melt polymerization process, polycarbonates are prepared by co-reacting, in a molten state, the dihydroxy reactant(s) (i.e. aliphatic diol and/or aliphatic diacid, and any additional dihydroxy compound) and a diaryl carbonate ester, such as diphenyl carbonate, or more specifically in an embodiment, an activated carbonate such as bis(methyl salicyl) carbonate, in the presence of a transesterification catalyst. The reaction may be carried out in typical polymerization equipment, such as one or more continuously stirred reactors (CSTR's), plug flow reactors, wire wetting fall polymerizers, free fall polymerizers, wiped film polymerizers, BANBURY® mixers, single or twin screw extruders, or combinations of the foregoing. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl)carboxylate, bis(4-acetylphenyl)carboxylate, or a combination comprising at least one of the foregoing.

All types of polycarbonate end groups are contemplated as being useful in the high and low Tg polycarbonates, provided that such end groups do not significantly adversely affect desired properties of the compositions. An end-capping agent (also referred to as a chain-stopper) can be used to limit molecular weight growth rate, and so control molecular weight of the first and/or second polycarbonate. Exemplary chain-stoppers include certain monophenolic compounds (i.e., phenyl compounds having a single free hydroxy group), monocarboxylic acid chlorides, and/or monochloroformates. Phenolic chain-stoppers are exemplified by phenol and $C_1$-$C_{22}$ alkyl-substituted phenols such as p-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms can be specifically mentioned.

Endgroups can be derived from the carbonyl source (i.e., the diaryl carbonate), from selection of monomer ratios, incomplete polymerization, chain scission, and the like, as well as any added end-capping groups, and can include derivatizable functional groups such as hydroxy groups, carboxylic acid groups, or the like. In an embodiment, the endgroup of a polycarbonate can comprise a structural unit derived from a diaryl carbonate, where the structural unit can be an endgroup. In a further embodiment, the endgroup is derived from an activated carbonate. Such endgroups can derive from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester endgroups. In an embodiment, the ester endgroup derived from a salicylic ester can be a residue of BMSC or other substituted or unsubstituted bis(alkyl salicyl) carbonate such as bis(ethyl salicyl) carbonate, bis(propyl salicyl) carbonate, bis(phenyl salicyl) carbonate, bis(benzyl salicyl) carbonate, or the like. In a specific embodiment, where BMSC is used as the activated carbonyl source, the endgroup is derived from and is a residue of BMSC, and is an ester endgroup derived from a salicylic acid ester, having the structure of formula (15):

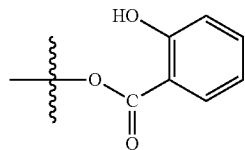

(15)

The reactants for the polymerization reaction using an activated aromatic carbonate can be charged into a reactor either in the solid form or in the molten form. Initial charging of reactants into a reactor and subsequent mixing of these materials under reactive conditions for polymerization may be conducted in an inert gas atmosphere such as a nitrogen atmosphere. The charging of one or more reactant may also be done at a later stage of the polymerization reaction. Mixing of the reaction mixture is accomplished by any methods known in the art, such as by stirring. Reactive conditions include time, temperature, pressure and other factors that affect polymerization of the reactants. Typically the activated aromatic carbonate is added at a mole ratio of 0.8 to 1.3, and more preferably 0.9 to 1.3, and all sub-ranges there between, relative to the total moles of monomer unit compounds. In a specific embodiment, the molar ratio of activated aromatic carbonate to monomer unit compounds is 1.013 to 1.29, specifically 1.015 to 1.028. In another specific embodiment, the activated aromatic carbonate is BMSC.

Polycarbonates with branching groups are also contemplated as being useful, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimesic acid, and benzophenone tetracarboxylic acid. The branching agents can be added at a level of about 0.05 to about 2.0 wt %. Mixtures comprising linear polycarbonates and branched polycarbonates can be used.

In addition to the polycarbonate copolymer, the blend compositions of the present invention include one or more fillers to provide selected characteristics to molded articles including the compositions of the present invention. Exemplary fillers include, but are not limited to, glass fillers (such as glass fiber, glass spheres and/or glass flakes), carbon fiber, carbon black, polytetrafluorethylene (PTFE), or a combination including at least one of the foregoing fillers.

The fillers may be between 2 weight %, 3 weight %, 4 weight %, 5 weight %, 6 weight %, 7 weight %, 6 weight %, 7 weight %, 8 weight %, 9 weight %, 10 weight %, 11 weight %, 12 weight %, 13 weight %, 14 weight %, 15 weight % to 30 weight %, 31 weight %, 32 weight %, 33 weight %, 34 weight %, 35 weight %, 36 weight %, 37 weight %, 38 weight %, 39 weight %, 40 weight %, 41 weight %, 42 weight %, 43 weight %, 44 weight %, 45 weight %, 46 weight %, 47 weight %, 48 weight %, 49 weight %, or 50 weight % based on the total weight of the composition. In one embodiment, the filler may be between 10 to 40 weight % based on the total weight of the composition.

In one embodiment, the blend polymer composition includes glass. Glass is a type of filler or reinforcing agent in polycarbonates to improve stiffness (modulus) and dimensional stability (coefficient of thermal expansion). The glass may be glass fibers, such as E, A, C, ECR, R, S, D, or NE glasses. The glass may be manufactured by Owen-Corning. The glass may be colorless or any color in the spectrum (i.e, blue, red, green, brown, green, yellow, etc). The glass may be in the form of glass flakes, glass fiber, and chopped glass.

In one embodiment, the glass fiber may be a cylinder. In another embodiment, glass fiber strand may be flat, having an oblong, elliptical, cylinder or rectangular cross-sectional shape with the ratio between its maximum and its minimum dimensions being in the range of between 1.2:1 and 10:1.

The length of the glass fiber may be, in one embodiment, from 1 to about 30 millimeters prior to molding. The length of the glass fiber may be, in another embodiment, at least 3 millimeters prior to molding. The length of the glass fiber may be, in yet another embodiment, at least 5 millimeters prior to molding. The length of the glass fiber may be, in still another embodiment, at least 10 millimeters prior to molding. The length of the glass fiber may be, in yet another embodiment, up to 20 millimeters prior to molding. The length of the glass fiber may be, in still another embodiment, up to 15 millimeters prior to molding. After molding, the length of the glass fiber may be less than specified above. For example, in one embodiment, the length of the glass fiber after molding may be 30 micrometers to 3 millimeters.

The diameter of the glass fiber may be, in one embodiment, from 4 to 20 micrometers, both before and after molding. The diameter of the glass fiber may be, in another embodiment, at least 8 micrometers. The diameter of the glass fiber may be, in yet another embodiment, up to 15 micrometers. The diameter of the glass fiber may be, in still another embodiment, up to 12 micrometers. The diameter of the glass fiber may be, in yet another embodiment, up to 10 micrometers.

The glass may be between 2 weight %, 3 weight %, 4 weight %, 5 weight %, 6 weight %, 7 weight %, 6 weight %, 7 weight %, 8 weight %, 9 weight %, 10 weight %, 11 weight %, 12 weight %, 13 weight %, 14 weight %, 15 weight % to 30 weight %, 31 weight %, 32 weight %, 33 weight %, 34 weight %, 35 weight %, 36 weight %, 37 weight %, 38 weight %, 39 weight %, 40 weight %, 41 weight %, 42 weight %, 43 weight %, 44 weight %, 45 weight %, 46 weight %, 47 weight %, 48 weight %, 49 weight %, or 50 weight % based on the total weight of the composition. In one embodiment, the glass may be between 5 to 35 weight % based on the total weight of the composition.

In another embodiment, the blend polymer composition includes carbon fiber. Carbon fiber is a type of filler or reinforcing agent in polycarbonates to improve stiffness (modulus) and conductivity.

The length of the carbon fiber may be, in one embodiment, from 1 to about 30 millimeters prior to molding. The length of the carbon fiber may be, in another embodiment, at least 3 millimeters prior to molding. The length of the carbon fiber may be, in yet another embodiment, at least 5 millimeters prior to molding. The length of the carbon fiber may be, in still another embodiment, at least 10 millimeters prior to molding. The length of the carbon fiber may be, in yet another embodiment, up to 20 millimeters prior to molding. The length of the carbon fiber may be, in still another embodiment, up to 15 millimeters prior to molding. After molding, the length of the carbon fiber may be less than specified above. For example, in one embodiment, the length of the carbon fiber after molding may be 30 micrometers to 3 millimeters.

The diameter of the carbon fiber may be, in one embodiment, from 4 to 20 micrometers, both before and after molding. The diameter of the carbon fiber may be, in another embodiment, at least 8 micrometers. The diameter of the carbon fiber may be, in yet another embodiment, up to 15 micrometers. The diameter of the carbon fiber may be, in still another embodiment, up to 12 micrometers. The diameter of the carbon fiber may be, in yet another embodiment, up to 10 micrometers.

The carbon fiber may be between 2 weight %, 3 weight %, 4 weight %, 5 weight %, 6 weight %, 7 weight %, 6 weight %, 7 weight %, 8 weight %, 9 weight %, 10 weight %, 11 weight %, 12 weight %, 13 weight %, 14 weight %, 15 weight % to 30 weight %, 31 weight %, 32 weight %, 33 weight %, 34 weight %, 35 weight %, 36 weight %, 37 weight %, 38 weight %, 39 weight %, 40 weight %, 41 weight %, 42 weight %, 43 weight %, 44 weight %, 45 weight %, 46 weight %, 47 weight %, 48 weight %, 49 weight %, or 50 weight % based on the total weight of the composition. In one embodiment, the carbon fiber may be between 5 to 35 weight % based on the total weight of the composition.

In another alternative embodiment, the blend polymer composition includes a conductive filler. Conductive fillers include, but are not limited to, carbonaceous fillers such as for example carbon black, carbon nanotubes, carbon fibers and graphite, or the like, or a combination including at least one of the foregoing carbonaceous fillers. Carbon black having average particle sizes of less than or equal to 200 nm are beneficial. In one embodiment, the carbon black has an average particle sizes of less than or equal to 100 nm can be used. In another embodiment, the carbon black has an average particle size of greater than or equal to 40 nm can be used. Carbon nanotubes can include single wall carbon nanotubes, multiwall carbon nanotubes, or the like. The carbon nanotubes generally have aspect ratios of greater than or equal to 2. In one embodiment, the carbon nanotubes have aspect ratios of greater than or equal to 100. In another embodiment, the carbon nanotubes have aspect ratios of greater than or equal to 1,000. The carbon nanotubes have diameters of 2 nm to 500 nm. In one embodiment, the carbon nanotubes have diameters of 5 nm to 100 nm. In one embodiment, the carbon nanotubes have diameters of 7 nm to 30 nm. Graphite fibers are generally obtained from the pyrolysis of pitch or polyacrylonitrile (PAN) based fibers. Graphite fibers having diameters of 1 micrometer to 30 micrometers and lengths of 0.5 millimeter to 2 centimeters can be used in the electrically conducting polymer composition.

In one embodiment, the conductive filler is carbon black and is added in pure form. In another embodiment, the conductive filler is carbon black that is added to the compound in form of masterbatch.

The conductive filler may be between 2 weight %, 3 weight %, 4 weight %, 5 weight %, 6 weight %, 7 weight %, 6 weight %, 7 weight %, 8 weight %, 9 weight %, 10 weight %, 11 weight %, 12 weight %, 13 weight %, 14 weight %, 15 weight % to 30 weight %, 31 weight %, 32 weight %, 33 weight %, 34 weight %, 35 weight %, 36 weight %, 37 weight %, 38 weight %, 39 weight %, 40 weight %, 41 weight %, 42 weight %, 43 weight %, 44 weight %, 45 weight %, 46 weight %, 47 weight %, 48 weight %, 49 weight %, or 50 weight % based on the total weight of the composition. In one embodiment, the conductive filler may be between 5 to 35 weight % based on the total weight of the composition.

In another alternative embodiment, the blend polymer composition includes a ceramic filler. Examples of suitable ceramic fillers are metal oxides, metal carbides, metal nitrides, metal hydroxides, metal oxides having hydroxide coatings, metal carbonitrides, metal oxynitrides, metal borides, metal borocarbides, or the like, or a combination including at least one of the foregoing inorganic materials. Metal cations in the foregoing ceramic fillers can be transition metals, alkali metals, alkaline earth metals, rare earth metals, or the like, or a combination including at least one of the foregoing metal cations.

Examples of suitable electrically conducting ceramic fillers are titanium diborides ($TiB_2$) tungsten carbide (WC), tin oxide, indium tin oxide (ITO), antimony tin oxide, titanium nitride (TiN), zirconium nitride (ZrN), titanium carbide (TiC), molybdenum silicide ($MoSi_2$), potassium titanate whiskers, vanadium oxides ($V_2O_3$), or a combination including at least one of the foregoing ceramic fillers.

The ceramic filler may be in the form of a powder, whisker, fibril or fiber, with diameter from 0.3~20 μm, and aspect ratio (L/D)>=1

The ceramic filler may be between 2 weight %, 3 weight %, 4 weight %, 5 weight %, 6 weight %, 7 weight %, 6 weight %, 7 weight %, 8 weight %, 9 weight %, 10 weight %, 11 weight %, 12 weight %, 13 weight %, 14 weight %, 15 weight % to 30 weight %, 31 weight %, 32 weight %, 33 weight %, 34 weight %, 35 weight %, 36 weight %, 37 weight %, 38 weight %, 39 weight %, 40 weight %, 41 weight %, 42 weight %, 43 weight %, 44 weight %, 45 weight %, 46 weight %, 47 weight %, 48 weight %, 49 weight %, or 50 weight % based on the total weight of the composition. In one embodiment, the conductive filler may be between 5 to 35 weight % based on the total weight of the composition.

In yet another alternative embodiment, the blend polymer composition includes polytetrafluoroethylene (PTFE). The PTFE may be between 2 weight %, 3 weight %, 4 weight %, 5 weight %, 6 weight %, 7 weight %, 6 weight %, 7 weight %, 8 weight %, 9 weight %, 10 weight %, 11 weight %, 12 weight %, 13 weight %, 14 weight %, 15 weight % to 30 weight % based on the total weight of the composition. In one embodiment, the PTFE may be between 5 to 20 weight % based on the total weight of the composition.

In addition to the polycarbonate copolymer and filler, the blend compositions of the present invention include various additives ordinarily incorporated in resin compositions of this type. Mixtures of additives may be used. Such additives may be mixed at a suitable time during the mixing of the components for forming the composition. The one or more additives are included in the thermoplastic compositions to impart one or more selected characteristics to the thermoplastic compositions and any molded article made therefrom without materially affecting cleanliness characteristics of a molded article containing the composition. Examples of additives that may be included in the present invention include, but are not limited to, heat stabilizers, process stabilizers, antioxidants, light stabilizers, antistatic agents, mold releasing agents, UV absorbers, lubricants, flow promoters, impact modifiers or a combination of one or more of the foregoing additives.

Suitable heat stabilizers include, for example, organo phosphites such as triphenyl phosphite, tris-(2,6-dimethylphenyl)phosphite, tris-(mixed mono- and di-nonylphenyl)

phosphite or the like; phosphonates such as dimethylbenzene phosphonate or the like, phosphates such as trimethyl phosphate, or the like, or combinations including at least one of the foregoing heat stabilizers. Heat stabilizers are generally used in amounts of from 0.01 to 0.5 parts by weight based on 100 parts by weight of the total composition, excluding any filler.

Suitable antioxidants include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis [methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations including at least one of the foregoing antioxidants. Antioxidants are generally used in amounts of from 0.01 to 0.5 parts by weight, based on 100 parts by weight of the total composition, excluding any filler.

Suitable light stabilizers include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone or the like or combinations including at least one of the foregoing light stabilizers. Light stabilizers are generally used in amounts of from 0.1 to 1.0 parts by weight, based on 100 parts by weight of the total composition, excluding any filler.

Suitable antistatic agents include, for example, glycerol monostearate, sodium stearyl sulfonate, sodium dodecylbenzenesulfonate or the like, or combinations of the foregoing antistatic agents. In one embodiment, carbon fibers, carbon nanofibers, carbon nanotubes, carbon black, or any combination of the foregoing may be used in a polymeric resin containing chemical antistatic agents to render the composition electrostatically dissipative.

Suitable mold releasing agents include for example, metal stearate, stearyl stearate, pentaerythritol tetrastearate, beeswax, montan wax, paraffin wax, or the like, or combinations including at least one of the foregoing mold release agents. Mold releasing agents are generally used in amounts of from 0.1 to 1.0 parts by weight, based on 100 parts by weight of the total composition, excluding any filler.

Suitable UV absorbers include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl) oxy]-2,2-bis[[(2-cyano-3,3-diphenylacryloyl)oxy]methyl] propane (UVINUL™ 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane nano-size inorganic materials such as titanium oxide, cerium oxide, and zinc oxide, all with particle size less than 100 nanometers; or the like, or combinations including at least one of the foregoing UV absorbers. UV absorbers are generally used in amounts of from 0.01 to 3.0 parts by weight, based on 100 parts by weight based on 100 parts by weight of the total composition, excluding any filler.

Suitable lubricants include for example, fatty acid esters such as alkyl stearyl esters, e.g., methyl stearate or the like; mixtures of methyl stearate and hydrophilic and hydrophobic surfactants including polyethylene glycol polymers, polypropylene glycol polymers, and copolymers thereof e.g., methyl stearate and polyethylene-polypropylene glycol copolymers in a suitable solvent; or combinations including at least one of the foregoing lubricants. Lubricants are generally used in amounts of from 0.1 to 5 parts by weight, based on 100 parts by weight of the total composition, excluding any filler.

There is no particular limitation on the method by which the compositions of the present invention may be prepared. For example, the ingredients may be placed into an extrusion compounder with the thermoplastic resin to produce molding pellets. Alternatively, the ingredients may be mixed with a thermoplastic resin by dry blending, then either fluxed on a mill and comminuted, or extruded and chopped. Further, the ingredients may also be mixed with powder or granular thermoplastic resin and directly molded, e.g., by injection or transferred molding techniques.

The present compositions may be extruded into pellets. The compositions may be molded, foamed, or extruded by known methods into various structures or articles, especially those benefiting from enhanced cleanliness, such as electronic equipment, electronic housings, or electronic components.

In a preferred embodiment of the method, the thermoplastic composition is extruded through the die at a temperature of about 280 to about 300.degree. C.; the thermoplastic composition comprises about 40 to about 50 weight percent of the polyamide, about 35 to about 45 weight percent of the poly(arylene ether), about 7 to about 13 weight percent of the glass fibers, and about 1 to about 3 weight percent of the polypropylene; the polyamide comprises a polyamide-6,6; the poly(arylene ether) comprises a poly(2,6-dimethyl-1,4-phenylene ether) having an intrinsic viscosity of about 0.35 to about 0.46 deciliter per gram measured at 25.degree. C. in chloroform; the polypropylene is a homopolypropylene having a weight average molecular weight of about 20,000 to about 500,000 atomic mass units; and the thermoplastic composition further comprises about 0.5 to about 2 weight percent of low density polyethylene and about 0.02 to about 0.5 weight percent of a copolymer of vinylidene fluoride and hexafluoropropylene, the copolymer having a fluorine content of about 60 to about 70 weight percent based on the total weight of the copolymer.

One embodiment of the present invention is a thermoplastic composition, comprising: 50 to 95% by weight of one or more polycarbonates wherein at least one of the polycarbonates is a polyester-polycarbonate having at least one unit derived from sebacic acid and has a biocontent of at least 5% according ASTM-D6866; and 5 to 50% by weight of at least one filler selected from glass, ceramic fiber, carbon fiber, a conductive filler, polytetrafluoroethylene, or a combination including at least one of the foregoing fillers; wherein the composition, as compared to a composition comprising a bisphenol A-based polycarbonate having the same at least one filler and filler loading, has a melt volume rate as measured according to ASTM-D1238-10 that is at least 20% higher, an impact strength that is at least 20% higher, and a liquid particle count that is at least 20% lower.

In a preferred embodiment, the thermoplastic composition comprises 65 to 90% by weight of one or more polycarbonates wherein at least one of the polycarbonates is a polyester-polycarbonate having at least one unit derived from sebacic acid and has a biocontent of at least 5% according ASTM-D6866; and 10 to 35% by weight of at least one filler selected from glass, carbon fiber, a conductive filler, polytetrafluorethylene, or a combination including at least one of the foregoing fillers; wherein the composition, as compared to a composition comprising a bisphenol A-based polycarbonate having the same at least one filler and filler loading, has a melt volume rate as measured according to ASTM-D1238-10 that is at least 20% higher, an impact strength that is at least 20% higher, and a liquid particle count that is at least 20% lower.

Another embodiment is a profile-extruded article comprising any of the compositions described herein.

The invention includes at least the following embodiments.

Embodiment 1

A thermoplastic composition, comprising: 50 to 95% by weight of one or more polycarbonates wherein at least one of the polycarbonates is a polyester-polycarbonate having at least one unit derived from sebacic acid and has a biocontent of at least 5% according ASTM-D6866; and 5 to 50% by weight of at least one filler selected from glass, ceramic fiber, carbon fiber, a conductive filler, polytetrafluorethylene, or a combination including at least one of the foregoing fillers; wherein the composition, as compared to a composition comprising a bisphenol A-based polycarbonate having the same at least one filler and filler loading, has a melt volume rate as measured according to ASTM-D1238-10 that is at least 20% higher, an impact strength that is at least 20% higher, and a liquid particle count that is at least 20% lower.

Embodiment 2

The composition of embodiment 1, wherein the at least one polyester-polycarbonate has a molecular weight average between 15,000 to 40,000 Daltons as measured by gel permeation chromatography polycarbonate standards and includes at least one polyester-polycarbonate that has (a) a weight average molecular weight between 30,000 to 40,000 Daltons as measured by gel permeation chromatography polycarbonate standards and 5.0 mole % (of total composition) to 15.0 mole % sebacic acid; or (b) a weight average molecular weight between 15,000 to 25,000 Daltons as measured by gel permeation chromatography using polycarbonate standards, and 5.0 mole % to 12.0 mole % sebacic acid.

Embodiment 3

The composition of embodiment 1 or 2, wherein at least one polyester-polycarbonate has a molecular weight average between 30,000 to 40,000 Daltons as measured by gel permeation chromatography polycarbonate standards and a 7.75 mole % to 8.75 mole % sebacic acid (of the total composition).

Embodiment 4

The composition of any of embodiments 1-3, wherein at least one polyester-polycarbonate has a molecular weight average between 15,000 to 25,000 Daltons as measured by gel permeation chromatography polycarbonate standards and a 5.5 mole % to 6.5 mole % sebacic acid (of the total composition).

Embodiment 5

The composition of any of embodiments 1-4, further comprising other additives such as heat stabilizers, mold release agents, impact modifiers, UV stabilizers, flame retardants, antistatic agents, anti-drip agents, radiation stabilizers and/or colorants.

Embodiment 6

The composition of any of embodiments 1-5, wherein the filler comprises glass fiber.

Embodiment 7

The composition of any of embodiments 1-6, wherein the filler comprises carbon fiber.

Embodiment 8

The composition of any of embodiments 1-7, wherein the filler comprises conductive carbon black.

Embodiment 9

The composition of any of embodiments 1-8, wherein the filler comprises carbon fiber and polytetrafluoroethylene.

Embodiment 10

The composition of any of embodiments 1-9, wherein the composition comprises 5 to 35% by weight of the at least one filler.

Embodiment 11

A thermoplastic composition comprising 65 to 90% by weight of one or more polycarbonates wherein at least one of the polycarbonates is a polyester-polycarbonate having at least one unit derived from sebacic acid and has a biocontent of at least 5% according ASTM-D6866; and 10 to 35% by weight of at least one filler selected from glass, carbon fiber, a conductive filler, polytetrafluorethylene, or a combination including at least one of the foregoing fillers; wherein the composition, as compared to a composition comprising a bisphenol A-based polycarbonate having the same at least one filler and filler loading, has a melt volume rate as measured according to ASTM-D1238-10 that is at least 20% higher, an impact strength that is at least 20% higher, and a liquid particle count that is at least 20% lower.

Embodiment 12

The composition of embodiment 11, wherein the at least one polyester-polycarbonate has a molecular weight average between 15,000 to 40,000 Daltons as measured by gel permeation chromatography polycarbonate standards and includes at least one polyester-polycarbonate that has (a) a weight average molecular weight between 30,000 to 40,000 Daltons as measured by gel permeation chromatography polycarbonate standards and 5.0 mole % (of total composition) to 15.0 mole % sebacic acid; or (b) a weight average molecular weight between 15,000 to 25,000 Daltons as measured by gel permeation chromatography using polycarbonate standards, and 5.0 mole % to 12.0 mole % sebacic acid.

Embodiment 13

The composition of embodiment 11 or 12, wherein at least one polyester-polycarbonate has a molecular weight average between 30,000 to 40,000 Daltons as measured by gel permeation chromatography polycarbonate standards and a 7.75 mole % to 8.75 mole % sebacic acid (of the total composition).

Embodiment 14

The composition of any of embodiments 11-13, wherein at least one polyester-polycarbonate has a molecular weight average between 15,000 to 25,000 Daltons as measured by gel permeation chromatography polycarbonate standards and a 5.5 mole % to 6.5 mole % sebacic acid (of the total composition).

Embodiment 15

The composition of any of embodiments 11-14, further comprising other additives such as heat stabilizers, mold release agents, impact modifiers, UV stabilizers, flame retardants, antistatic agents, anti-drip agents, radiation stabilizers and/or colorants.

Embodiment 16

The composition of any of embodiments 11-15, wherein the filler comprises glass fiber.

Embodiment 17

The composition of any of embodiments 11-16, wherein the filler comprises carbon fiber.

Embodiment 18

The composition of any of embodiments 11-17, wherein the filler comprises conductive carbon black.

Embodiment 19

The composition of any of embodiments 11-18, wherein the filler comprises carbon fiber and polytetrafluoroethylene.

Embodiment 20

A profile-extruded article comprising the composition of any of embodiments 1-10.

Embodiment 21

A profile-extruded article comprising the composition of any of embodiments 11-19.

The present invention is further illustrated by the following non-limiting examples.

All materials used can be found in the tables below. Weight-averaged molecular weight values reported in the Tables below were obtained by gel permeation chromatography (GPC), using a crosslinked styrene-divinylbenzene column and calibrated to polycarbonate references. GPC samples are prepared at a concentration of about 1 mg/ml, and are eluted at a flow rate of about 1.5 ml/min using methylene chloride as the solvent.

Table 1 below provides a general description of the materials used in this application. The compounding was processed on Toshiba SE37 mm twin-screw extruder. The glass fiber, carbon fiber or conductive carbon black was fed in down stream, zone 7. Other components were fed from main throat from upper stream. Additives were pre-blended with polycarbonate (PC) powder by superblender and then fed. The preblending, extrusion, molding, handling and sampling strictly follow the Clean Compounding System (CCS) standard operating procedure, a controlled compounding process of generating material meeting special ionic and outgassing specifications for semi-conductive industry from selected raw material, with strict process setting requirement. Table 2 listed compounding and Table 3 for molding condition.

TABLE 1

Raw material list

| Item | SABIC IP Raw material code | Description | Cas# | Function |
|---|---|---|---|---|
| 1 | Resin | SABIC IP Lexan* copolymer, C914089 | 137397-37-6 | Resin |
| 2 | Resin | SABIC IP Lexan* copolymer, C914090 | 137397-37-6 | Resin |
| 3 | F232 | ACRYLIC POLYMER IMPACT MODIFIER, PELLETS, EXL3330 | 25852-37-3, 471-34-1 | Impact modifier |
| 4 | G512972 | Nittobo, CSG 3PA-830, flat glass fiber | 65997-17-3 | Filler |
| 5 | 168138 | Ketjen Carbon Powder E300 | 1333-86-4 | Filler |
| 6 | F5401 | PELLETIZED CARBON FIBER, Fortafil 202 | 70892-43-2 | Filler |
| 7 | F538 | 8 PENTAERYTHRITOL TETRASTEARATE | 115-83-3 | Mold release agent |
| 8 | F545207 | Formosa carbon fiber CS-2516 | 7440-44-0 | Filler |
| 9 | F544702 | Toho Tenax A HT C483 6 mm carbon fiber | 7440-44-0 | Filler |
| 10 | F6860 | PTFE | 9002-84-0 | Filler |

TABLE 2

Compounding process set-up

| Parameters | UOM | Settings |
|---|---|---|
| Compounder Type | NONE | Toshiba TEM-37BS |
| Barrel Size | mm | 1500 |
| Die | mm | 4 |

TABLE 2-continued

Compounding process set-up

| Parameters | UOM | Settings |
|---|---|---|
| Zone 1 Temp | °C. | 50 |
| Zone 2 Temp | °C. | 100 |
| Zone 3 Temp | °C. | 200 |
| Zone 4 Temp | °C. | 250 |
| Zone 5 Temp | °C. | 250-270 |
| Zone 6 Temp | °C. | 250-270 |
| Zone 7 Temp | °C. | 250-270 |
| Zone 8 Temp | °C. | 250-270 |
| Zone 9 Temp | °C. | 250-270 |
| Zone 10 Temp | °C. | 250-270 |
| Zone 11 Temp | °C. | 250-270 |
| Die Temp | °C. | 255-275 |
| Screw speed | rpm | 300-400 |
| Throughput | kg/hr | 30-50 |
| Vacuum | MPa | −0.08 |
| Side Feeder speed | rpm | 300 |
| Side feeder1 | Note | barrel 7 |

TABLE 3

Molding set-up

| Parameter | Unit | Settings |
|---|---|---|
| Cnd: Pre-drying time | Hour | 4-6 |
| Cnd: Pre-drying temp | °C. | 90-110 |
| Hopper temp | °C. | 50 |
| Zone 1 temp | °C. | 260-280 |
| Zone 2 temp | °C. | 280-320 |
| Zone 3 temp | °C. | 280-320 |
| Nozzle temp | °C. | 280-320 |
| Mold temp | °C. | 90-120 |
| Screw speed | rpm | 100 |
| Back pressure | kgf/cm$^2$ | 30-80 |
| Cooling time | s | 20 |
| Molding Machine | NONE | FANUC |
| Shot volume | mm | 84 |
| Injection speed(mm/s) | mm/s | 60 |
| Holding pressure | kgf/cm$^2$ | 800 |
| Max. Injection pressure | kgf/cm$^2$ | 1000 |

Cleanliness was evaluated in terms of leachable ion content (LIC), outgassing, total organic compounds (TOC) and liquid particle counts (LPC). For all of cleanliness parameters, lower is better.

LPC: The LPC test was based on molded parts that parts were immersed in deionized water, and extracted in an ultrasonic tank (68 KHz) for 30 min. The particles in the water having a particle size from 0.3~2.0 micron were counted.

Outgassing: The specimen was detected using a dynamic head-space Gas Chromatograph/Mass Spectrometer (DHS-GCMS) under 85° C. for 3 hours with either pellets or molded parts;

TOC: both volatile and non-volatile organic compounds were controlled on pellets or molding bar or both of them, which were then evaluated by out-gassing and NVR testing. This method includes the steps of testing 10 g pellets that are soaked with 10 ml hexane for 10 min. 8 ml of solution is dried to remove the solvent, then 1 ml hexane is added to resolubilize the solution. The solution is again dried and then 50 μl D10-Anthracene-2 ppm standard in methylene chloride is added. Total C18-C40 Hydrocarbons (HC, refer to an organic compound that contains only carbon and hydrogen) and TOC are measured for target materials using a Gas Chromatograph/Mass Spectrometer (GCMS) with the injector temperature at 300° C.

Leachable IC level including fluoride, chloride, nitride, bromide, nitrate, phosphate, sulfate, and ammonium ions were determined using ion chromatography. The test specimen was rinsed by deionized (DI) water at 85° C. for 1 hour, and then tested by ion chromatography.

Pure HFD PC resin showed comparable IC level with LF PC (BPA polycarbonate made by interfacial process) with PCP endcap or LX PC (BPA polycarbonate made by melt process) with phenol endcap, similar outgassing level as LF PC, but lower outgassing vs LX PC, as shown in table 4.

TABLE 4

IC and Outgassing comparison between HFD PC and normal BPA PC

|  | BPA PC (LF PC) | BPA PC (LX PC) | HFD PC |
|---|---|---|---|
| Leachable IC |  |  |  |
| F— | 1 | ND | ND |
| Cl— | 8 | 14 | 7 |
| [NO2]— | ND | ND | ND |
| [SO4]2— | 16 | 19 | 14 |
| [Br]— | ND | ND | ND |
| [NO3]— | ND | ND | ND |
| [PO4]3— | ND | ND | ND |
| [NH4]+ | ND | ND | ND |
| Outgassing |  |  |  |
| TOA | 0.004 | 0.000 | 0.002 |
| TOAE | 0.006 | 0.013 | 0.006 |
| TOS | 0.015 | 0.003 | 0.008 |
| TA | 0.012 | 0.024 | 0.016 |
| TAD | 0.014 | 0.006 | 0.023 |
| TSI | 0.005 | 0.004 | 0.006 |
| TPOL | 0.017 | 0.309 | 0.010 |
| TPH | 0.000 | 0.000 | 0.003 |
| TSolv | 0.108 | 0.072 | 0.115 |
| THC | 0.015 | 0.012 | 0.015 |
| CPD | 0.003 | 0.000 | 0.000 |
| HHC | 0.006 | 0.023 | 0.009 |
| ALD | 0.002 | 0.002 | 0.001 |
| UN | 0.081 | 0.029 | 0.043 |
| Total | 0.288 | 0.497 | 0.257 |

HFD PC (sebacic acid/BPA/PCP polyestercarbonate) and conductive carbon black (CCB) composite shows lower LPC value compared to BPA PC, but similar outgassing and leachable IC.

Formulations and typical properties of polycarbonate filled with carbon fiber were shown in Table 5. It can be can seen that with same carbon fiber percentage, composites based on HFD PC showed higher MVR and lower viscosity compared with BPA PC based material even with a higher molecular weight. It can also be seen that at low carbon fiber loading, HFD PC based composites showed similar HC and TOC level as standard BPA PC, while when carbon fiber loading went up, HFD PC based composites showed much lower HC and TOC.

TABLE 5

| | | | | | | |
|---|---|---|---|---|---|---|
| | | | Conductive carbon black filled polycarbonates | | | |
| Items | Test Method | Unit | Comp. Ex. 1 | Example 1 | Example 2 | Comp. Ex. 2 |
| C023A | 100 GRADE PCP | % | 22.5 | | | 22.9 |
| C017 | PCP 1300 | % | 69 | | | 68 |
| C914089 | Sebacic Acid/BPA copolymer | % | | 49 | 22.9 | |
| C914090 | Sebacic acid/BPA/PCP polyestercarbonate | % | | 42.5 | 68 | |
| F538 | 8 PENTAERYTHRITOL TETRASTEASTEARATE | % | 0.2 | 0.2 | 0.1 | 0.1 |
| 168138 | Ketjen carbon powder E300 | % | 8.3 | 8.3 | 9 | 9 |
| | | Typical properties | | | | |
| MVR | 300° C./2.16 Kg | cm$^3$/10 min | 5.17 | 6.45 | | |
| Surface Resistivity | ASTM D 257 | OHM-P-SQ | 1.30E+07 | 8.50E+06 | | |
| Volume Resistivity | ASTM D 257 | Ohm-cm | 8.72E+06 | 8.18E+05 | | |
| Flexural Modulus | ASTM D 790 | MPa | 2570 | 2480 | | |
| Flexural Stress-Y | ASTM D 790 | MPa | 101 | 97.2 | | |
| Flexural Stress-B | ASTM D 790 | MPa | 99 | 95.3 | | |
| Impact Strength | Notched-IZOD, ASTM D256 | J/m | 53.5 | 58.2 | | |
| Modulus of Elasticity | ASTM D 638 | MPa | 2644.4 | 2562.2 | | |
| Stress-Y | ASTM D 638 | MPa | 63.6 | 60.9 | | |
| Stress-B | ASTM D 638 | MPa | 51.5 | 48.3 | | |
| Elongation-Y | | % | 5.4 | 4.9 | | |
| Elongation-B | ASTM D 638 | % | 22.6 | 25.9 | | |
| Specific Gravity-Avg | ASTM D 792 | — | 1.222 | 1.215 | | |
| | | Cleanness | | | | |
| LPC* | Multiple wash | | 5 | 2 | | |
| Hydrocarbon (HC) | Rinse by hexane, and test by | ppb | | | 2.49 | 2.0 |
| TOC | GCMS, 300° C. | ppb | | | 44.1 | 50 |
| Outgassing-pel | GCMS, 85° C./3 hours | ppm | 0.311 | 0.393 | 0.192 | 0.966 |
| Outgassing-bar | GCMS, 85° C./3 hours | ppm | 0.413 | 0.333 | 0.025 | 0.053 |
| | | Leachable IC, Pellets level/molding part level | | | | |
| Fluoride | DIW rinse for 3 hours @85° C. | ppb | / | / | ND/ND | ND/ND |
| Chloride | DIW rinse for 3 hours @85° C. | ppb | / | / | 6/3 | 14/3 |
| Nitrite | DIW rinse for 3 hours @85° C. | ppb | / | / | ND/ND | ND/ND |
| Bromide | DIW rinse for 3 hours @85° C. | ppb | / | / | ND/ND | ND/ND |
| Nitrate | DIW rinse for 3 hours @85° C. | ppb | / | / | 6/8 | ND/ND |
| Phosphate | DIW rinse for 3 hours @85° C. | ppb | / | / | ND/ND | ND/ND |
| Sulfate | DIW rinse for 3 hours @85° C. | ppb | / | / | 13/5 | 19/3 |
| Ammonium | DIW rinse for 3 hours @85° C. | ppb | / | / | ND/ND | 5/ND |

TABLE 6

Carbon fiber filled polycarbonates

| Item code | Item description | Unit | Comp. Ex. 3 | Comp. Ex. 4 | Comp. Ex. 5 | Comp. Ex. 6 | Comp. Ex. 7 | Comp. Ex. 8 | Example 3 | Example 4 | Example 5 | Example 6 |
|---|---|---|---|---|---|---|---|---|---|---|---|---|
| | | | | | Main throat | | | | | | | |
| F538 | PENTAERYTHRITOL TETRASTEARATE | % | 0.2 | 0.2 | 0.2 | 0.2 | 0.2 | 0.2 | 0.2 | 0.2 | 0.2 | 0.2 |
| C914090 | Sebacic acid/BPA/PCP polyestercarbonate | % | | | | | | | 24.8 | 22.3 | 19.8 | 16.2 |
| C914089 | Sebacic Acid/BPA copolymer | % | | | 69 | 67.5 | 60 | | 75 | 67.5 | 60 | 48.6 |
| C017 | PCP 1300 | % | 75 | 70.5 | 22.8 SF-7 | 22.3 | 19.8 | 48.6 | | | | |
| C023A | 100 GRADE PCP | % | 24.8 | 23.3 | | | | 16.2 | | | | |
| F545207 | Formosa chopped carbon fiber CS-2516 | % | 0 | 6 | 8 | 10 | 20 | 35 | 0 | 10 | 20 | 35 |
| | | | 100 | 100 | 100 | 100 | 100 | 100 | 100 | 100 | 100 | 100 |

| Test Code | Test Description | Unit | Comp. Ex. 3 | Comp. Ex. 4 | Comp. Ex. 5 | Comp. Ex. 6 | Comp. Ex. 7 | Comp. Ex. 8 | Example 3 | Example 4 | Example 5 | Example 6 |
|---|---|---|---|---|---|---|---|---|---|---|---|---|
| MVR @ 300 C./2.16 Kg | ASTM D1238 | cm³/10 min | 35.2 | 23.4 | 21.4 | 19.2 | 14.1 | 10.3 | 47.8 | 25.3 | 17.4 | 13.7 |
| MFR @ 300 C./2.16 Kg | ASTM D1238 | | 35.9 | 24.9 | 23.2 | 21.1 | 16.1 | 12.5 | 50.2 | 27.3 | 19.7 | 16.5 |
| Melt Viscosity 11443(MV)-ISO | Shear Rate | / | App. Viscosity | App. Viscosity | App. Viscosity | App. Viscosity | App. Viscosity | App. Viscosity | App. Viscosity | App. Viscosity | App. Viscosity | App. Viscosity |
| | 100 1/s | Pa·s | 276.3 | 337.08 | 365.82 | 386.82 | 495.12 | 624.43 | 181.25 | 314.98 | 419.97 | 503.97 |
| | 200 1/s | Pa·s | 270.79 | 320.52 | 345.94 | 362.52 | 442.1 | 548.2 | 177.39 | 286.26 | 370.26 | 436.57 |
| | 500 1/s | Pa·s | 253.25 | 289.46 | 307.01 | 317.69 | 372.55 | 451.64 | 166.45 | 249.25 | 303.7 | 351.66 |
| | 1000.01 1/s | Pa·s | 228.38 | 252.04 | 262.25 | 266.36 | 301.69 | 365.5 | 150.18 | 207.5 | 243.93 | 285.91 |
| | 1500 1/s | Pa·s | 206.23 | 225.76 | 228.93 | 233.57 | 259.51 | 313.08 | 137.66 | 179.2 | 208.9 | 246.69 |
| | 3000 1/s | Pa·s | 155.88 | 168.18 | 169.07 | 173.52 | 187.93 | 224.51 | 109.97 | 134.43 | 152.93 | 182.92 |
| | 5000 1/s | Pa·s | 119.41 | 127.79 | 128.76 | 132.1 | 140.96 | 163.93 | 87.47 | 104.34 | 117.8 | 137.43 |
| | 10000 1/s | Pa·s | X | 82.34 | 83.03 | 84.28 | 91.47 | 103.86 | 59.72 | X | 77.7 | X |
| Tensile Modulus | ASTM D 638 | MPa | 2180.4 | 4840.6 | 5977 | 7157 | 12824 | 20045.6 | 2161.2 | 7138.2 | 12852 | 20692.2 |
| Tensile Strength @ Y | ASTM D 638 | | 61.6 | 50.8 | 18.8 | 0 | 0 | 0 | 59 | 97.6 | 0 | 0 |
| Tensile Strength @ B | ASTM D 638 | | 59.4 | 77 | 92.6 | 101.8 | 134 | 154 | 48.6 | 97.6 | 130 | 151.2 |
| Tensile Elongation @ B | ASTM D 638 | | 87.2 | 4 | 3.2 | 2.9 | 2.4 | 1.8 | 73.4 | 2.8 | 2.3 | 1.8 |
| Flexural Modulus | ASTM D790 | MPa | 2120 | 4250 | 5370 | 6200 | 11100 | 17800 | 1990 | 5760 | 11000 | 17800 |
| Flexural Strength @ Y | ASTM D790 | MPa | 93 | 137 | 153 | 162 | 208 | 242 | 91.1 | 156 | 206 | 234 |
| Flexural Strength @ B | ASTM D790 | MPa | 91.3 | 135 | 150 | 160 | 207 | 242 | 89.4 | 154 | 205 | 233 |
| Impact Strength, Notched IZOD | ASTM D256 | J/m | 774 | 67.6 | 69.1 | 67.8 | 72.7 | 66.6 | 810 | 63.1 | 74.3 | 67.5 |

TABLE 6-continued

| | | Carbon fiber filled polycarbonates | | | | | | | | | |
|---|---|---|---|---|---|---|---|---|---|---|---|
| Surface Resistivity | ASTM D257 | OHM-P-SQ | 1.8E+15 | 8.6E+14 | 2.1E+14 | 360000 | 15000 | 8400 | 8E+15 | 11000000 | 24000 | 13000 |
| Density | ASTM D 792 | | 1.194 | 1.216 | 1.223 | 1.232 | 1.274 | 1.342 | 1.188 | 1.225 | 1.267 | 1.337 |
| Impact Strength | ASTM D 256 | J/m | 2150 | 837 | 691 | 628 | 499 | 464 | 2150 | 662 | 516 | 505 |
| Un-notched IZOD | | % | / | / | / | / | / | / | / | / | / | / |
| Mw-pellets | GPC | | 45022 | 45425 | 44842 | 44861 | 44184 | 43012 | 48317 | 48161 | 47288 | 45704 |
| Mn-pellets | GPC | | 18487 | 18425 | 17932 | 18019 | 17358 | 16453 | 18858 | 18490 | 17942 | 16852 |
| D-pellets | GPC | | 2.44 | 2.47 | 2.5 | 2.49 | 2.55 | 2.61 | 2.56 | 2.6 | 2.64 | 2.71 |
| Mw-part | GPC | | 44920 | 44882 | 44747 | 44648 | 43704 | 42678 | 46525 | 47398 | 46971 | 44853 |
| Mn-part | GPC | | 18075 | 18155 | 18010 | 18166 | 17275 | 16249 | 18368 | 18194 | 17753 | 16570 |
| D-part | GPC | | 2.49 | 2.47 | 2.48 | 2.46 | 2.53 | 2.63 | 2.53 | 2.61 | 2.65 | 2.71 |
| C18-C40 hydrocarbon | Ppb | | 9.13 | 8.47 | / | 9.25 | 2.65 | 18.6 | 2.64 | 4.64 | 7.32 | 8.84 |
| TOC | ppb | | 52.8 | 57.9 | 57.9 | 57.9 | 43.0 | 160.2 | 43 | 62.2 | 70.2 | 102.8 |

Another example is 15% carbon fiber and 15% PTFE filled polycarbonate based on sebacic acid/BPA/PCP polyestercarbonate (HFD PC) and standard polycarbonate (BPA PC), formulations and typical properties are shown in Table 7. From the table, we can see that compared with standard BPA PC, HFD PC based material show similar strength, leachable IC and outgassing, but ~60% higher MFR, ~20% higher impact strength, and 35%~60% lower LPC.

TABLE 7

Polycarbonate filled with carbon fiber and PTFE hybrid filler

| Item Code | Item Description | Unit | Example 7 | Comp. Ex. 9 |
|---|---|---|---|---|
| C914089 and C914090 | Sebacic acid/BPA/PCP polyestercarbonate | % | 69.8 | / |
| C017 and C023A | Standard Lexan* LF PC | | / | 69.8 |
| F6860 | PTFE | % | 15 | 15 |
| F538 | PENTAERYTHRITOL TETRASTEARATE | % | 0.2 | 0.2 |
| R203 | PIGMENT CARBON BLACK, MEDIUM COLOR POWDER | % | 0.2 | 0.2 |
| F544702 | Toho Tenax A HT C483 6 mm | % | 15 | 15 |

| Typical Properties | Test Method | Unit | 1# | 2# |
|---|---|---|---|---|
| MFR | ASTM D1238, 300 C./2.16 Kg | g/10 min | 16.7 | 10.3 |
| Modulus of Elasticity | ASTM D 638 | MPa | 10423.4 | 10541 |
| Stress at Break | ASTM D 638 | MPa | 115.4 | 118.6 |
| Elongation at Break | ASTM D 638 | % | 2.5 | 2.4 |
| Flexural Modulus | ASTM D 790 | MPa | 9690 | 8540 |
| Flexural Stress at Break | ASTM D 790 | MPa | 189 | 172 |
| Impact strength | ASTM D256, notched IZOD | J/m | 102 | 83 |
| Outgassing | GCMS, 85° C./3 hours | ppm | 0.831 | 1.376 |
| Leachable IC | | | | |
| Fluoride | Ion Chromatography | ppb | 353 | 332 |
| Chloride | Ion Chromatography | ppb | 5 | 8 |
| Nitrite | Ion Chromatography | ppb | ND | ND |
| Bromide | Ion Chromatography | ppb | ND | ND |
| Nitrate | Ion Chromatography | ppb | ND | ND |
| Phosphate | Ion Chromatography | ppb | ND | ND |
| Sulfate | Ion Chromatography | ppb | 18 | 15 |
| Ammonium | Ion Chromatography | ppb | 30 | 27 |
| LPC (>0.3 m) | Ion Chromatography | Counts/cm$^2$ | 56156 | 123497 |
| LPC (>0.3 m) | Ion Chromatography | Counts/cm$^2$ | 138638 | 212864 |

While typical embodiments have been set forth for the purpose of illustration, the foregoing descriptions should not be deemed to be a limitation on the scope of the invention. Accordingly, various modifications, adaptations, and alternatives may occur to one skilled in the art without departing from the spirit and scope of the present invention.

What is claimed is:

1. A thermoplastic composition, comprising:
(a) 50 to 95% by weight of at least one polyester-polycarbonate having a weight average molecular weight between 30,000 to 40,000 Daltons as measured by gel permeation chromatography polycarbonate standards and 5.0 mole % to 15.0 mole % sebacic acid and at least one polyester-carbonate having a weight average molecular weight between 15,000 to 25,000 Daltons as measured by gel permeation chromatography using polycarbonate standards and 5.0 mole % to 12.0 mole % sebacic acid; and
(b) 5 to 50% by weight of at least one filler selected from glass, ceramic fiber, carbon fiber, a conductive filler, polytetrafluoroethylene, or a combination including at least one of the foregoing fillers;

wherein the composition, as compared to a composition comprising a bisphenol A-based polycarbonate having at least one same filler and filler loading, has a melt volume rate as measured according to ASTM-D1238-10 that is at least 20% higher, an impact strength that is at least 20% higher, and a liquid particle count that is at least 20% lower.

2. The composition of claim 1, wherein the polyester-polycarbonate having a molecular weight average between 30,000 to 40,000 Daltons as measured by gel permeation chromatography polycarbonate standards has 7.75 mole % to 8.75 mole % sebacic acid of the total composition.

3. The composition of claim 1, wherein the polyester-polycarbonate having a molecular weight average between 15,000 to 25,000 Daltons as measured by gel permeation chromatography polycarbonate standards has 5.5 mole % to 6.5 mole % sebacic acid of the total composition.

4. The composition of claim 1, further comprising other additives such as heat stabilizers, mold release agents, impact modifiers, UV stabilizers, flame retardants, antistatic agents, anti-drip agents, radiation stabilizers and/or colorants.

5. The composition of claim 1, wherein the filler comprises glass fiber.

6. The composition of claim 1, wherein the filler comprises carbon fiber.

7. The composition of claim 1, wherein the filler comprises conductive carbon black.

8. The composition of claim 1, wherein the filler comprises carbon fiber and polytetrafluoro ethylene.

9. The composition of claim 1, wherein the composition comprises 5 to 35% by weight of the at least one filler.

10. An article of manufacture comprising the composition of claim 1.

11. A thermoplastic composition, comprising:
(a) 65 to 90% by weight of at least one polyester-polycarbonate having a weight average molecular weight between 30,000 to 40,000 Daltons as measured by gel permeation chromatography polycarbonate standards and 5.0 mole % to 15.0 mole % sebacic acid and at least one polyester-carbonate having a weight average molecular weight between 15,000 to 25,000 Daltons as measured by gel permeation chromatography using polycarbonate standards and 5.0 mole % to 12.0 mole % sebacic acid; and
(b) 10 to 35% by weight of at least one filler selected from glass, carbon fiber, a conductive filler, polytetrafluoroethylene, or a combination including at least one of the foregoing fillers;
wherein the composition, as compared to a composition comprising a bisphenol A-based polycarbonate having at least one same filler and filler loading, has a melt volume rate as measured according to ASTM-D1238-10 that is at least 20% higher, an impact strength that is at least 20% higher, and a liquid particle count that is at least 20% lower.

12. The composition of claim 11, wherein the polyester-polycarbonate having a molecular weight average between 30,000 to 40,000 Daltons as measured by gel permeation chromatography polycarbonate standards has 7.75 mole % to 8.75 mole % sebacic acid of the total composition.

13. The composition of claim 11, wherein the polyester-polycarbonate having a molecular weight average between 15,000 to 25,000 Daltons as measured by gel permeation chromatography polycarbonate standards has 5.5 mole % to 6.5 mole % sebacic acid of the total composition.

14. The composition of claim 11, further comprising other additives such as heat stabilizers, mold release agents, impact modifiers, UV stabilizers, flame retardants, antistatic agents, anti-drip agents, radiation stabilizers and/or colorants.

15. The composition of claim 11, wherein the filler comprises glass fiber.

16. The composition of claim 11, wherein the filler comprises carbon fiber.

17. The composition of claim 11, wherein the filler comprises conductive carbon black.

18. The composition of claim 11, wherein the filler comprises carbon fiber and polytetrafluoro ethylene.

19. An article of manufacture comprising the composition of claim 11.

* * * * *